United States Patent [19]

Thompson

[11] Patent Number: 4,494,889
[45] Date of Patent: Jan. 22, 1985

[54] SHAFT BUSHING AND HUB ASSEMBLY

[75] Inventor: Dennis R. Thompson, Weaverville, N.C.

[73] Assignee: Reliance Electric Company, Greenville, S.C.

[21] Appl. No.: 513,623

[22] Filed: Jul. 14, 1983

[51] Int. Cl.³ ............................................. F16D 1/00
[52] U.S. Cl. ........................................ 403/4; 403/16; 403/370
[58] Field of Search .................... 403/370, 16, 4, 3

[56] References Cited

U.S. PATENT DOCUMENTS

| | | |
|---|---|---|
| 2,402,743 | 6/1946 | Firth . |
| 2,482,662 | 9/1949 | Dunne ................................. 403/16 |
| 2,509,711 | 5/1950 | Williams . |
| 2,519,958 | 8/1950 | Firth . |
| 2,763,158 | 9/1956 | Firth . |
| 2,856,211 | 10/1958 | Firth . |
| 2,986,416 | 5/1961 | Firth . |
| 3,134,268 | 5/1964 | Firth . |
| 3,368,833 | 2/1968 | Chung . |
| 3,677,583 | 7/1972 | Steinke . |
| 3,682,505 | 8/1972 | Firth ................................. 403/370 |

OTHER PUBLICATIONS

Reliance Electric Co. Catalog, QD Bushings, pp. D1-13.
Reliance Electric Co. Bulletin A988 (120.7), Technical Data-Bushings.
Reliance Electric Co. Bulletin A988 (100.2), Bushings & Hubs.

*Primary Examiner*—Andrew V. Kundrat
*Attorney, Agent, or Firm*—Marmaduke A. Hobbs

[57] ABSTRACT

A bushing and hub assembly for mounting sheaves, sprockets, gears, couplings and similar machine elements on a shaft, wherein two types of tapered bushings are used, the bushings having bodies of the same taper used with a single hub which is compatible with both bushings. One of the bushings has a radially extending annular flange at the large end of the tapered body and the other bushing is flangeless. The screw holes and plain holes are provided in the flange and at the interface of the bushing and hub for securing the selected bushing in place in the hub for mounting the machine element on the shaft with screws for tightening the bushings securely in place on the shaft and in the hub bore. The two bushings and the sidewalls of the hub all have the same taper and are interchangeable with one another, to provide optimum performance and convenience of installation.

17 Claims, 9 Drawing Figures

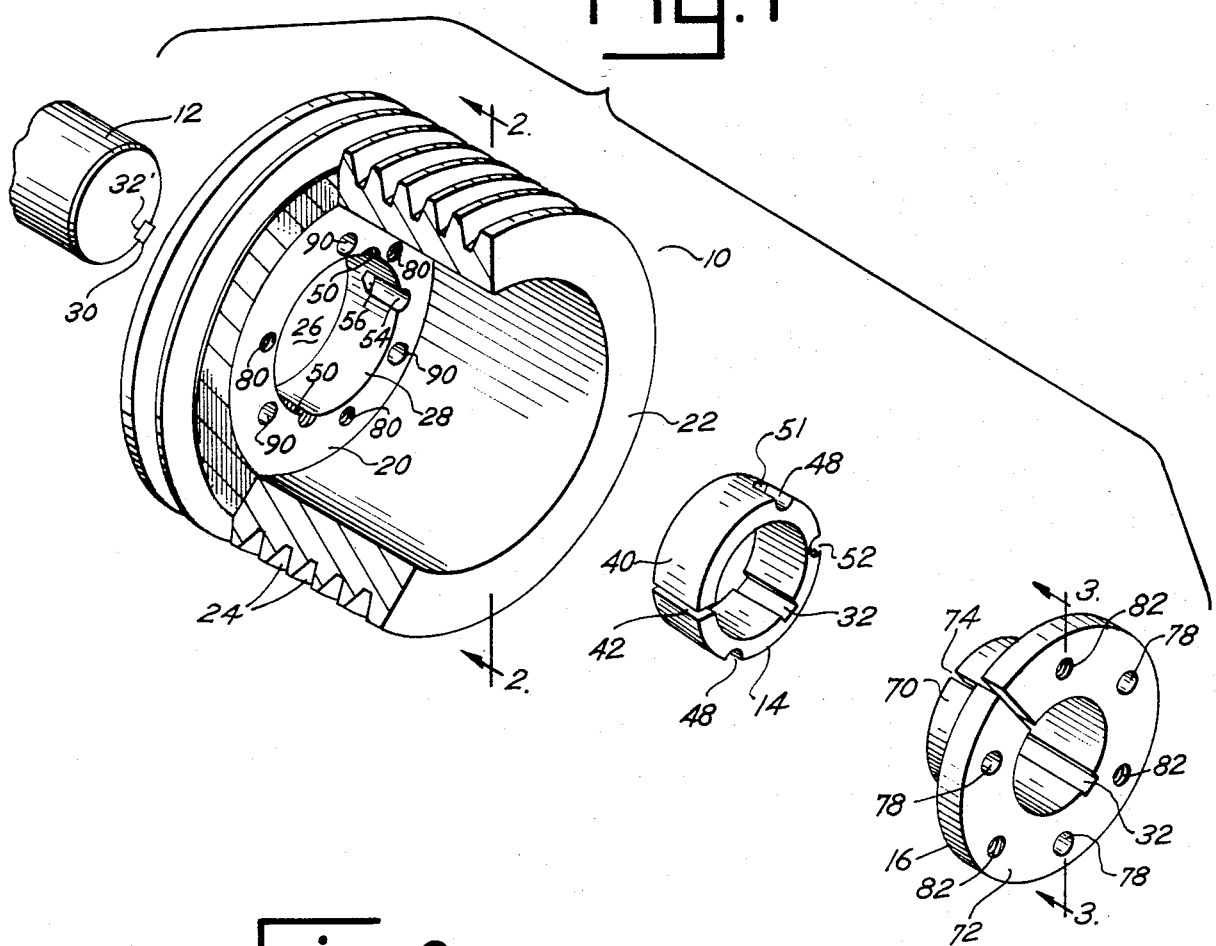
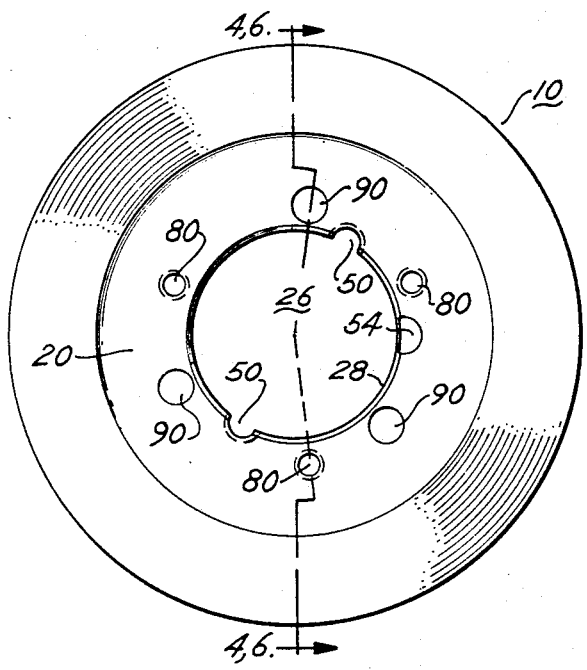
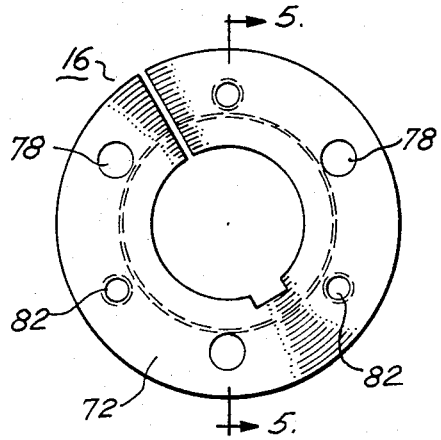

4,494,889

SHAFT BUSHING AND HUB ASSEMBLY

BACKGROUND OF THE INVENTION

A well known structure for mounting sheaves, sprockets, couplings, gears and similar machine elements onto shafts consists of a tapered bushing having a longitudinal slit extending the length thereof and a cylindrical bore therethrough, for gripping the shaft internally and seating on a corresponding tapered surface in the bore of the hub of the machine element. There are generally two types of tapered bushings which are extensively used for securing the machine elements to the shaft, one consisting of a tapered body of a frustoconical shape secured in the hub bore, normally by two screws seated in holes intersecting the interface of the bushing and hub and having screw threads in the portion thereof in the hub and having a plain surface in the portion in the bushing. The screws abut against the end of the hole portion in the bushing and, when the screw is tightened, the end of the screw forces the bushing into the tapered bore of the hub, thereby causing the bushing to contract around and grip the shaft and to seat firmly onto the tapered surface of the bore. When the bushing has been secured in place in the machine element, the ends thereof are normally substantially flush with the respective ends of the hub, as are the heads of the securing screws. The bushings are removed from the bores of the hubs by one or more jackscrews seating in holes similar to the securing holes, except that the screw threaded and plain portions are reversed with respect to the bushing and hub, and the abutment for the jackscrews is in the hub.

The other type of bushing is similar to the first one described above with respect to the tapered body, but instead of having the holes for the securing screws at the interface of the bushing and hub, the bushing has a radial annular flange disposed on the large end of the tapered body, usually containing three plain holes for receiving screws which extend through the flange into threaded holes in the end of the hub. The screws have heads thereon, and when the screws are tightened, they force the flange toward the end of the hub and the bushing body into the hub bore, thereby seating the tapered surface of the bushing on the tapered surface of the hub and contracting the bushing body onto the shaft. In the past, these two types of bushing were not interchangeable in the hubs of the various machine elements and hence, if both lines of bushing were to be made available to customers as on-the-shelf items, it was necessary to stock two lines of machine elements, such as sheaves, sprockets, couplings and gears, for the respective type of bushing. This not only increased the inventory of the various elements and parts for mounting them on the shafts, but also increased the fabricating, handling and storage costs.

SUMMARY OF THE INVENTION

It is one of the principal objects of the present invention to provide a combination bushing and hub structure which permits the interchangeability of the foregoing two types of bushings for any particular kind of machine element without requiring any structural modification in the parts thereof to fully adapt one or the other bushing to the particular hub, and to provide a combination bushing and hub structure in which at least one of the bushings can be secured in the hub bore by access to the securing means from either end of the hub.

Another object of the invention is to provide a relatively simple system for utilizing both types of bushings in a single type of machine element hub, permitting the bushing types to be interchanged to adapt the machine elements to various applications and types of installation and to provide compatibility between the various types of hubs and machine elements for maximum cost saving in fabrication, handling and storage and for effective inventory reduction and control.

The foregoing objects and other objects and advantages which will become apparent from the following description, are achieved by the combination of two types of tapered bushing with bodies of the same taper and a single hub which is compatible with both bushings, one of the bushings being flangeless and having two or more securing screws seated in holes at the interface of the bushing and hub, and the other of the bushings being provided with a radial, annular flange on the large end of the bushing body and preferably having three securing screws extending through the flange into threaded holes in the hub, or alternatively, extending through the hub into threaded holes in the flange. Jackscrews are normally utilized in both types of bushings for retracting the bushings from the bores in the hubs. In the flangeless type, one or more special holes are provided at the aforementioned interface for the jackscrew or screws, while in the flange type, one of the threaded sets of holes in the flange or hub is used for the jackscrews. The most suitable type of bushing can be selected for any particular application or installation, and the types of bushings can be interchanged in the field, if required or desirable, without changing the sheave, sprocket or other machine element in use.

BRIEF DESCRIPTION OF THE DRAWINGS

FIG. 1 is an exploded perspective view of a sheave, shaft and alternate bushings for securing the sheave to the shaft;

FIG. 2 is an end elevational view of the sheave as shown in FIG. 1;

FIG. 3 is an end elevational view of one of the bushings shown in FIG. 1, as viewed from line 3—3;

DETAILED DESCRIPTION OF THE INVENTION

Figure 4:
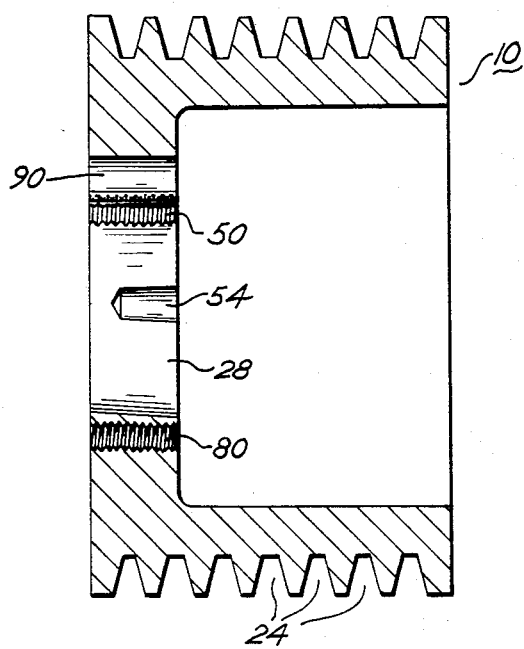
FIG. 4 is an axial cross-sectional view of the sheave shown in the preceding figures, the section being taken on line 4—4 of FIG. 2.
Figure 5:
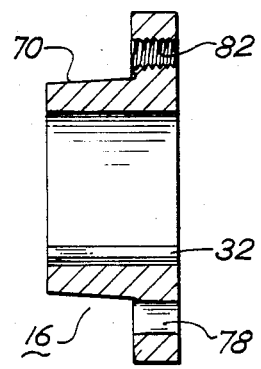
FIG. 5 is an axial cross-sectional view of the bushing shown in FIG. 3, the section being taken on line 5—5 of the latter figure.

Referring more specifically to the drawings and to FIG. 1 in particular, numeral 10 indicates a sheave, with shaft 12 and shaft bushings 14 and 16, the two bushings being interchangeable with one another in the bushing and hub assembly. While a V-belt sheave has been shown in the drawings, it is merely for the purpose of showing the present invention, which, in addition to a variety of different types of sheaves, is capable of being used with a variety of different shaft mounted machine elements including sprockets, gears and couplings. Throughout the description herein, reference will be made principally to a sheave or sheaves; however, this specific reference is for illustrative purposes only, and is not intended in any way to be a limitation to the types of shaft mounted machine elements to which the present invention is applicable.

Figure 8:
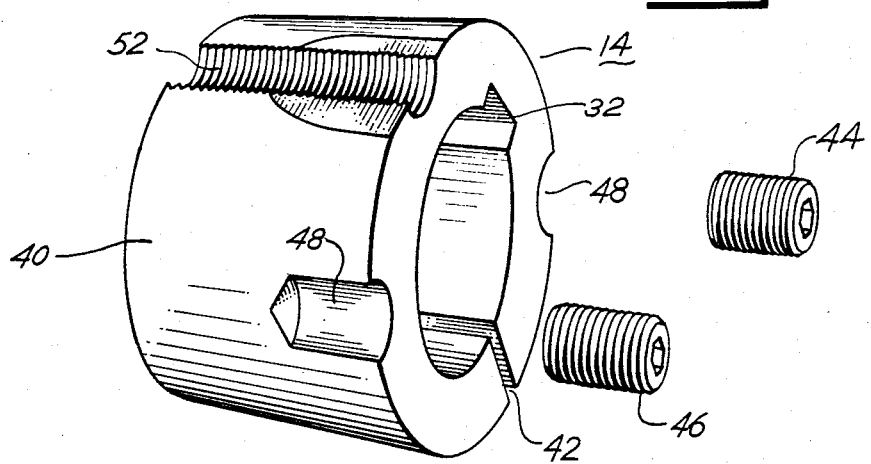
FIG. 8 is a perspective view of the other bushing shown in FIG. 1, illustrating the manner in which the bushing is secured in the bore of the hub of a sheave or other machine element.
Figure 9:
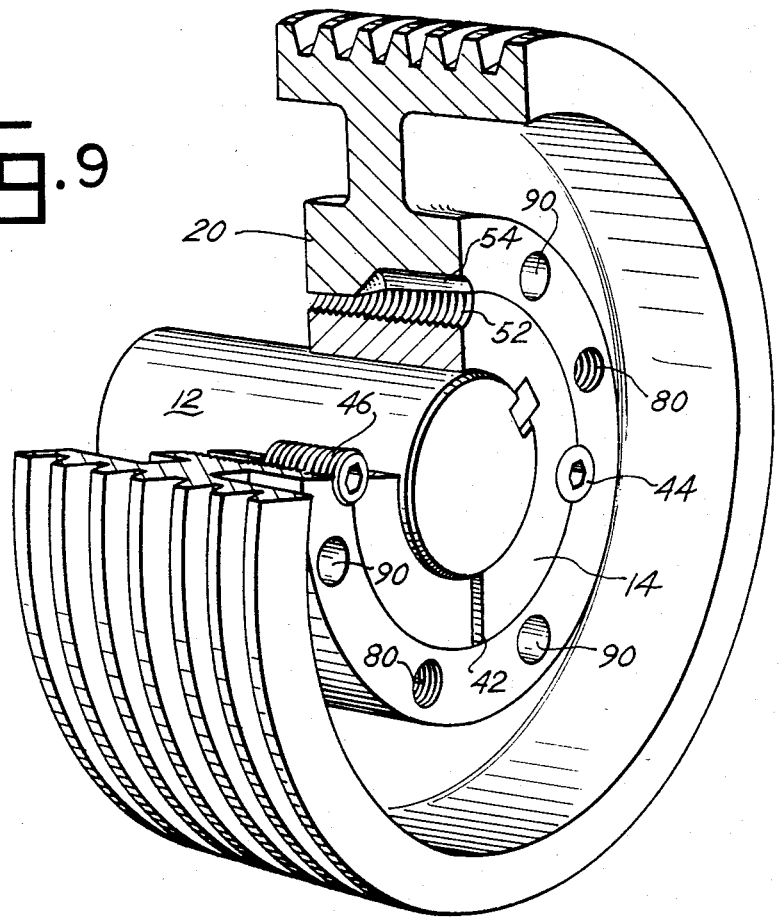
FIG. 9 is a cut-away perspective view of an assembled sheave mounted on a shaft, using the bushing shown in FIG. 8.

The sheave shown in the drawings has a hub 20 and a cylindrical portion 22 joined integrally to the hub and having a plurality of V-belt grooves 24 in the periphery thereof. The hub has a bore 26 with a tapered inner surface 28 for receiving either bushing 14 or 16 for mounting the sheave on shaft 12, shaft 12 having a key indicated by numeral 30 for matching keyways 32 and 32' in the two bushings and the shaft, respectively. The bushing 14 includes an annular body 40 having a tapered outer surface corresponding to the tapered surface 28 of the hub, and a slit 42 extending axially and radially through the annular body 40, thus permitting the bushing to contract around the shaft in a manner to be more fully described later herein. The bushing 14 is inserted in the bore 26 and screws 44 and 46, as shown in full in FIG. 8, are inserted into holes intersecting the interface of the hub and bushing, as shown in FIG. 9. The portion 48 of each hole in the bushing coincides with the threaded portions 50 in the inner surface of the hub. In the securing operation, the hub is started into the bore 26 and, after the sheave and bushing have been assembled around the shaft, the screws are threaded into the holes formed by the two half portions, and as the screws advance along the threads in the hub, the screws abut against the inner ends 51 of the hole portions in the bushing, forcing the bushing along the tapered surface of the hub, thereby contracting the bushing around the shaft. As the bushing contracts around the shaft, it grips the shaft and the tapered sidewall of the bushing seats firmly on the tapered surface of the bore 26, securing the hub to the bushing and the bushing to the shaft in a firm relationship to maintain the parts in assembled position on the shaft after the screws are fully tightened in their respective holes. One or more jack-screws are preferably provided for removing the bushing from the hub, the assembly shown in FIG. 1 having a threaded hole segment 52 and a plain hole segment 54 in the bushing and hub, respectively. After the securing screws 44 and 46 have been removed, a similar screw is inserted in the hole formed by half segments 52 and 54 and seats on the inner end of hole segment 54 in the hub, forcing the bushing axially relative to the hub to release it from the hub. The bushing just described is not provided with a radial flange and the ends thereof are normally substantially flush with the opposite ends of the hub when the bushing is secured fully in place.

The hub is designed for the alternative and interchangeable bushing 16 so that either of the two bushings can be used in the assembly without any modifications or machining operations for adapting the hubs to a particular installation. Bushing 16 consists of an annular body 70 with a taper identical to the one on annular body 40 of bushing 14, and an annular, radially outwardly extending flange 72 formed or secured integrally to the large end of the tapered body 70. A slit 74 extends axially and radially through the body and flange, so that the bushing seats in the hub bore and can contract around the shaft in a manner similar to that described with reference to bushing 14. In using bushing 16, the bushing and sheave are assembled on the shaft, and screws 76 are inserted through the three plain holes 78 extending through flange 72, and are threadedly received in matching threaded holes 80 in the end wall of the hub. As these three screws are tightened, the bushing is forced inwardly along the tapered surface of bore 26, which results in the bushing contracting around the shaft and the tapered surface of body 70 seating firmly on the tapered surface of bore 26. While three holes are shown in the embodiment of the drawings, a greater number of holes may be used for larger shaft mounted machine elements if necessary or desirable. When the sheave is to be removed from the shaft, the screws 76 are removed from holes 78 and one or more of the screws are threaded through holes 82 in the flange 72 seating on the adjacent end of hub 20. As the screws are tightened, the bushing and hub are moved relative to one another, thereby releasing the forces holding the hub on the bushing and the bushing on the shaft. The sheave and bushing can then readily be removed from the shaft and disassembled.

Figure 6:
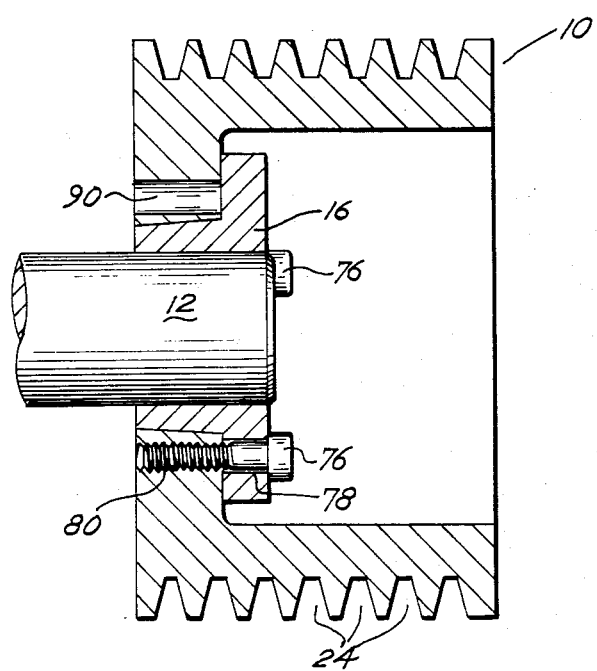
FIGS. 6 and 7 are axial cross-sectional views of the sheave, showing it mounted on a shaft, using the bushing illustrated in FIGS. 3 and 5, the section being taken on line 6—6 of FIG. 2.
Figure 7:
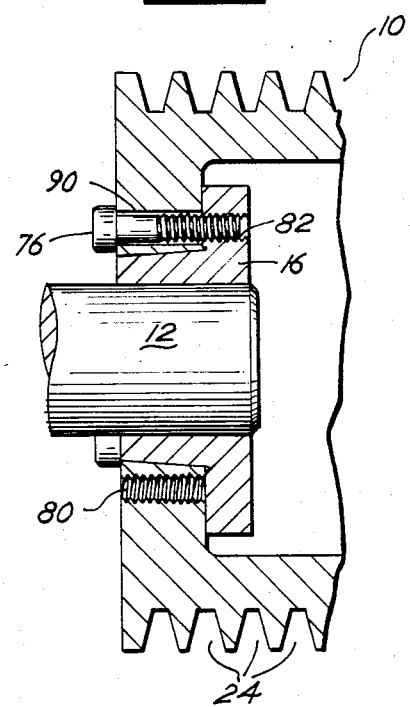

The bushing 16 is capable of being assembled from either end of the hub, as illustrated in FIGS. 6 and 7, wherein the arrangement of FIG. 6 represents that previously described herein, and the arrangement of FIG. 7 represents the procedure of securing bushing 16 from the opposite end of the hub. In the latter arrangement, the screws 76 are inserted through three unthreaded holes 90 in the hub, and into matching threaded holes 82 in the flange of bushing 16. As the screws 76 of the arrangement shown in FIG. 7 are tightened, the bushing is drawn into the tapered hole of the hub and secures the bushing to the shaft and the sheave to the bushing in the manner described hereinbefore. When the sheave is to be removed from the shaft, screws 76 are removed from holes 82 and 90 and inserted in threaded holes 80 and tightened to the point where the ends thereof seat against the flange on the opposite side of the hub. As the screws are further tightened, the bushing and hub are moved relative to one another, thereby releasing the hub from bore 26 and permitting the sheave and the bushing to be removed from the shaft. In order to permit the threaded holes 82 in the flange to be used to remove the bushing from the hub, as for example in the arrangement shown in FIG. 6, the holes 82 are not aligned with the unthreaded holes in the hub when the screws 76 are inserted through holes 78 into holes 80 during the securing operation; thus, the screws 76, when functioning as jackscrews and inserted in holes 82 for removing the bushing, abut against the solid end of the hub, rather than in aligned or matching holes. This same relationship exists in the arrangement shown in FIG. 7. Thus, no special threaded holes are required for the jackscrews in order to obtain effective release of the bushing from the hub with the flange-type bushing 16.

In the shaft bushing and hub assembly of the present invention, bushings 14 or 16 can be selected for the most effective and convenient arrangement for mounting the sheave on the shaft, and the flanged bushing 16 can secure the sheave on the shaft from the end of the hub which is most convenient for making the installation, and which will give optimum performance of the sheave. If, in certain installations, the axial space available for the sheave is limited and the flange and heads of the screws of bushing 16 would interfere with the assembly, bushing 14 can effectively be used, since in the final installation of this bushing, it is substantially flush with the ends of the hub, thereby not requiring any additional space for the securing means. Since the two bushings 14 and 16 are interchangeable with one another and require only a single hub design to fully utilize the advantages of the two bushings, the present dual bushing and hub arrangement permits the maximum versatility in adapting the sheave or other machine element to various applications and installations, while, at the same time, reducing the inventory needed to meet the requirements of the various applications.

While only one embodiment and several modifications have been described herein, various changes and further modifications may be made without departing from the scope of the invention.

I claim:

1. A bushing and hub assembly for mounting a machine element on a shaft, comprising a hub having an axial bore with side walls tapered from one end of the hub bore to the other end, a first bushing having a frustoconically shaped body for seating in the bore of said hub, means defining spaced holes at the interface of said bushing and hub with screw threads in the portion of the holes in said hub, screws for threaded engagement with the screw threads in the hub hole portion and in abutting relationship with the inner end of the bushing hole portion, a second bushing interchangeable with said first bushing having a frustoconically shaped body for seating in the bore of said hub and having a radially extending annular flange on the larger end of the body and being adapted to extend radially along one end of said hub, a plurality of threaded holes in the end of said hub adjacent said flange extending in axial parallel relationship with the bore and being spaced radially outwardly from said bore, a plurality of plain holes extending through said flange for alignment with said threaded holes in the end of said hub, and screws for extending through the holes in said flange and into the holes in the end of said hub, said bushing bodies having the same taper as the taper of the side walls of said hub and having a radial and axially disposed slit extending the length of the respective bushings.

2. A bushing and hub assembly as defined in claim 1 in which said flange has a plurality of threaded holes extending therethrough and said hub has a plurality of plain holes extending therethrough in alignment with the threaded holes of said flange for receiving screws extending through said plain holes into the threaded holes of said flange.

3. A bushing and hub assembly as defined in claim 2 in which said plain holes in said hub are equally spaced around said axial bore and said threaded holes in said hub are equally spaced around said axial bore, each of said threaded holes being spaced closer to one adjacent plain hole than to the other adjacent plain hole.

4. A bushing and hub assembly as defined in claim 1 in which a further hole is provided at the interface of said first bushing and hub, extending inwardly from the larger end of the bore, the portion of said hole in the bushing having screw threads therein for receiving a screw adapted to abut against the end of the hole portion in the hub for applying a force to remove the bushing from the hub.

5. A bushing and hub assembly as defined in claim 2 in which a further hole is provided at the interface of said first bushing and hub, extending inwardly from the larger end of the bore, the portion of said hole in the bushing having screw threads therein for receiving a screw adapted to abut against the end of the hole portion in the hub for applying a force to remove the bushing from the hub.

6. A bushing and hub assembly as defined in claim 1 in which a keyway extends the full length of each of said bushings for receiving a key in a keyway of the shaft on which the machine element is mounted.

7. A bushing and hub assembly as defined in claim 5 in which a keyway extends the full length of each of said bushings for receiving a key in a keyway of the shaft on which the machine element is mounted.

8. A bushing and hub assembly for mounting a machine element on a shaft, comprising a hub having an axial bore with sidewalls tapered from one end of the hub bore to the other end, a first bushing having a frustoconically shaped body for seating in the bore of said hub, means defining spaced holes in the interface of the bushing and hub with the screw threads in the portion of the holes in said hub, screws for threaded engagement with screw threads in the hub hole portion and in abutting relationship with the inner end of the bushing hole portion, a second bushing interchangeable with said first bushing and having a frustoconically shaped body for seating in the bore of said hub and having a radially extending annular flange disposed on the larger end of said body and being adapted to extend radially along one end of said hub, a plurality of alternate sets of threaded and plain hole means in the end of said hub adjacent said flange, a plurality of alternate sets of threaded and plain hole means extending through the flange in axial parallel relationship with the bore and being spaced radially outwardly from the bore for alignment with the alternate threaded or plain hole means of the hub, and screws for extending through one set of plain hole means into one set of threaded hole means.

9. A bushing and hub assembly as defined in claim 8 in which one alternate set of hole means of said flange will align at any one time with only one alternate set of hole means of said hub.

10. A bushing and hub assembly as defined in claim 9 in which a further hole is provided at the interface of said first bushing and hub, extending inwardly from the larger end of the bore, the portion of said hole in the bushing having screw threads therein for receiving a screw adapted to abut against the end of the hole portion in the hub for applying a force to remove the bushing from the hub.

11. A bushing and hub assembly as defined in claim 10 in which a keyway extends the full length of each of said bushings for receiving a key in a keyway of the shaft on which the machine element is mounted.

12. A bushing and hub assembly as defined in claim 8 in which a keyway extends the full length of each of said bushings for receiving a key in a keyway of the shaft on which the machine element is mounted.

13. A hub for mounting a machine element on a shaft using either a flanged or a non-flanged bushing, having a frustoconically shaped longitudinally split body with identically tapered side walls, the flanged bushing having a plurality of axially disposed plain holes and a plurality of threaded holes spaced from one another and extending through the flange, and the non-flanged bushing having a plurality of spaced hole portions in the surface of the tapered body and spaced from one another: said hub having an axial bore with sidewalls tapered to correspond to the taper on said bushings, spaced threaded hole portions in the sides of said bore extending inwardly from the larger end of said tapered sidewalls, a plurality of threaded holes in the end of the hub extending in axial parallel relationship with the bore and being spaced radially outwardly from the bore for alignment with the plain holes in the flange, and a plurality of plain holes in axial parallel relationship with the bore and being spaced radially outwardly from the bore extending through the hub for alignment with said threaded holes in the flange.

14. A hub as defined in claim 13 in which said plain holes in said hub are equally spaced around said axial bore and said threaded holes in said hub are equally spaced around said axial bore, but not in equally spaced relationship with said plain holes.

15. A hub as defined in claim 14 in which a half hole is provided in the surface of said bore, extending inwardly from the larger end of the bore.

16. A bushing and hub assembly as defined in claim 13 in which a keyway extends the full length of each of said bushings for receiving a key in a keyway of the shaft on which the machine element is mounted.

17. A bushing and hub assembly as defined in claim 15 in which a keyway extends the full length of each of said bushings for receiving a key in a keyway of the shaft on which the machine element is mounted.

* * * * *